United States Patent [19]
Wiegel

[11] Patent Number: 6,088,975
[45] Date of Patent: Jul. 18, 2000

[54] HURRICANE PROTECTION FOR MOBILE HOMES AND SMALL BUILDINGS

[76] Inventor: J. Parr Wiegel, 10B Pennwood Dr., Rochester, N.Y. 14625

[21] Appl. No.: 09/389,893

[22] Filed: Sep. 3, 1999

[51] Int. Cl.[7] ....................................................... E04B 7/00
[52] U.S. Cl. ........................... 52/169.1; 52/63; 52/273.13; 52/223.14; 52/3; 52/4; 52/169.1; 52/DIG. 11
[58] Field of Search ............................. 52/223.13, 223.14, 52/169.1, 63, DIG. 11, 23, DIG. 12, 3, 4; 4/502, 498, 500, 503

[56] References Cited

U.S. PATENT DOCUMENTS

| | | | |
|---|---|---|---|
| 5,791,090 | 8/1999 | Gitlin | 52/23 |
| 5,881,499 | 3/1999 | Luzzi | 52/23 |

*Primary Examiner*—Carl D. Friedman
*Assistant Examiner*—Christy M. Syres
*Attorney, Agent, or Firm*—Robert J. Bird

[57] ABSTRACT

One system of mobile home (or other structure) wind protection includes a channel below ground level around the structure, the channel including a lid around its perimeter adapted to open and close. Tie-down anchor bolts are spaced along the channel around the structure. Tie-down cables extend from the roof of the structure into the channel, each cable being removably connected to one of the anchor bolts. A storm shield secured to the tie-down cables likewise extends from the roof of the structure and into the channel below ground level. Another system includes a storage channel below ground level on one side of the structure, with ground anchors spaced along it supporting a ratcheted cable windup mechanism below ground level, all covered by a housing, and an anchor channel below ground level along the opposite side of the structure, with ground anchors spaced along it. A tie-down cable extends from each of the ground anchors in the storage channel, up and over the structure to a corresponding one of the ground anchors in the anchor channel. A storm shield secured to the tie-down cables likewise extends from below ground in the storage channel to below ground in the anchor channel.

5 Claims, 4 Drawing Sheets

6,088,975

HURRICANE PROTECTION FOR MOBILE HOMES AND SMALL BUILDINGS

BACKGROUND OF THE INVENTION

This invention is a revolutionary system for protection of small buildings, mobile homes, and the like against winds of hurricane force.

Hurricanes do most of their worst damage to houses and other smaller buildings. Hurricanes, like earthquakes, attack structures mainly from the sides. But there are significant differences between the stresses exerted by short-lived ground motions and those created by the relentless pressure of hurricane-force winds. The wind shoves a building repeatedly, sometimes pushing its frame out of alignment or even lifting it off its foundation. It jabs at nooks and crannies along the surface, nibbling at weak points until it finds a way in.

When a high wind blows directly against the side of a typical wood frame house, it exerts a high or positive pressure on that side (the windward side) and creates a vacuum pressure area on the opposite side (the leeward side). Thus, walls and windows on the windward side of the house are in danger of being pushed in, while on the leeward side they may be sucked right off the house. And the moment the wind breaks in through a window or door, the sudden pressure buildup inside the house can cause doors and other weak places on the leeward side to pop right out. The wind then combines with rain to destroy the interior of the house and its contents.

Heretofore, the standard approach to hurricane protection has been to strengthen a structure in numerous ways, including the use of enough nails, stiffener boards, metal straps, storm shutters, shatter resistant windows, and foundation bolts. These measures are only a partial solution. They do not prevent a building from being buffeted by wind.

Mobile homes are especially vulnerable to hurricane winds. Hurricane Andrew in 1992 destroyed virtually every mobile home in Homestead, Florida. Hurricane force winds exert two different force components on a mobile home. First, the structure takes a pounding from direct wind contact against a flat surface. Second, the wind is forced around, up, and over the structure creating a vacuum pressure on the opposite side. These two components, together with the circumstance that most mobile homes have open space underneath and very little structural integrity, create a dangerous situation. Standard hurricane protection in the case of mobile homes is the use of anchors and tie-down cables spaced around the structure.

The most relevant prior art that I know of is known as the Hunker Down System. It is an external structure including a cable-reinforced net that covers the roof of a building, home, or mobile home. The net is anchored to metal beams that stand vertically against the walls and surround the building. Steel cables tie the beams together and also anchor them to the ground. The net over the roof increases the roof's wind resistance. Shingles or tiles will not easily fly away in the wind. The beams and cables that surround the building reinforce its outer walls against wind. Reinforcing the building from the outside and anchoring it to the ground gives the building greater structural integrity.

SUMMARY OF THE INVENTION

A mobile home (or other structure) wind protection system according to one form of this invention includes a channel below ground level around the structure, the channel including a lid around its perimeter adapted to open and close. Tie-down anchor bolts are spaced along the channel around the structure. Tie-down cables extend from the roof of the structure into the channel, each cable being removably connected to one of the anchor bolts. A storm shield secured to the tie-down cables likewise extends from the roof of the structure and into the channel below ground level.

In another embodiment, the system includes a storage channel below ground level on one side of the structure, with ground anchors spaced along it supporting a ratcheted cable windup mechanism below ground level, all covered by a housing, and an anchor channel below ground level along the opposite side of the structure, with ground anchors spaced along it. A tie-down cable extends from each of the ground anchors in the storage channel, up and over the structure to a corresponding one of the ground anchors in the anchor channel. A storm shield secured to the tie-down cables likewise extends from below ground in the storage channel to below ground in the anchor channel.

DETAILED DESCRIPTION

Figure 1:
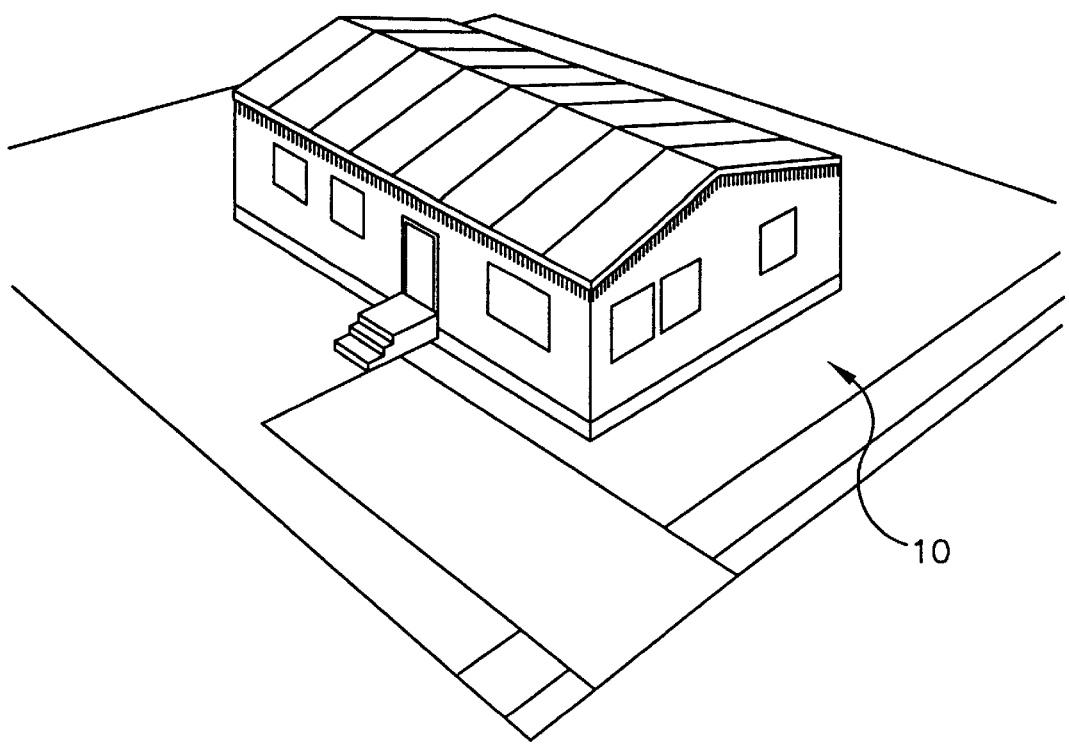
FIG. 1 shows a one-story house, an example of the environment for this invention.
Figure 2:
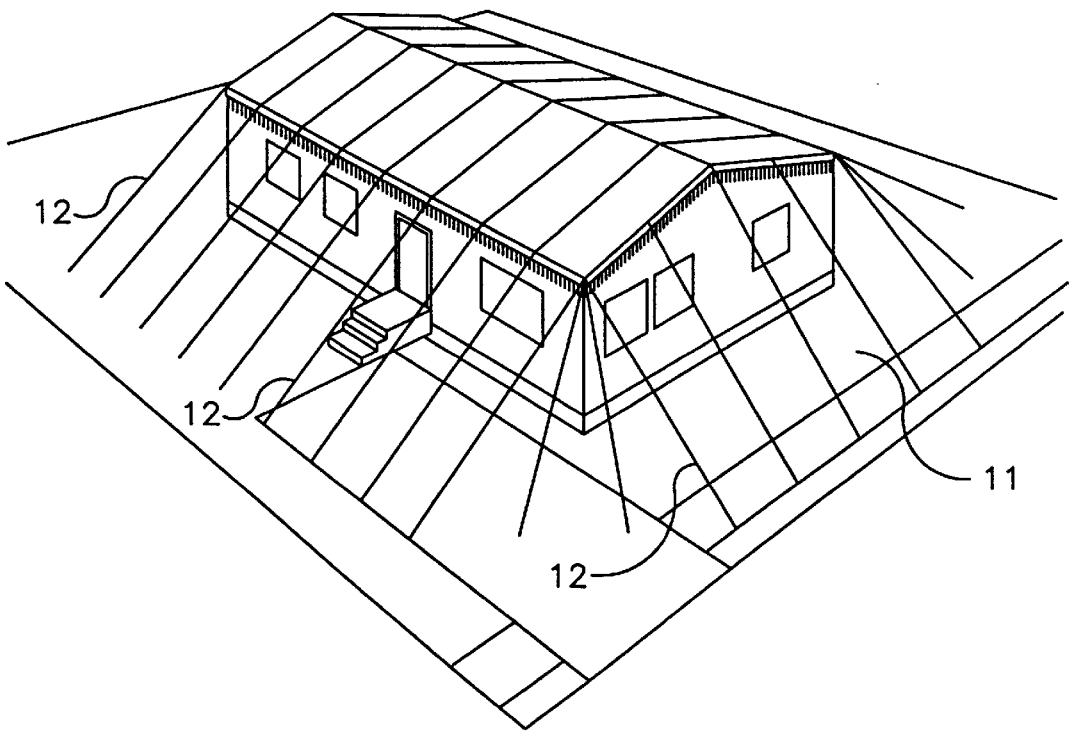
FIG. 2 shows the same house with the hurricane protection system in place.
Figure 3:
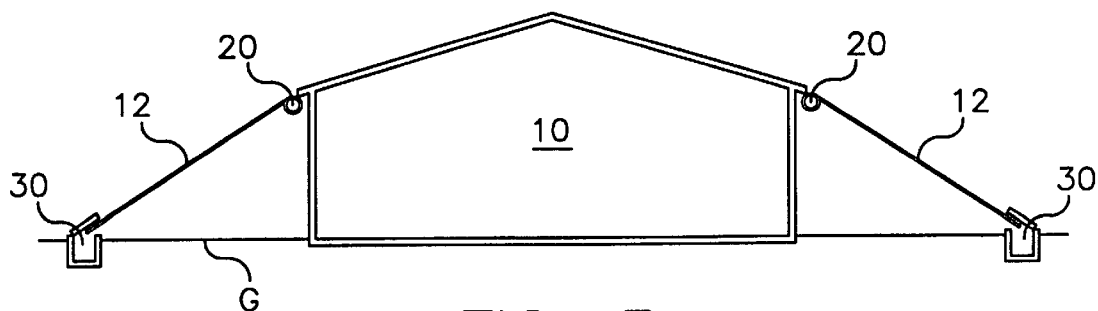
FIG. 3 is an elevation view, as from the right end of FIG. 2.

FIG. 1 shows a one-story structure. FIGS. 2 and 3 show the mobile home or structure 10 including a hurricane protection system of this invention. The system includes a storm shield 11 of rip stop material with tie-down cables 12 embedded in it. The storm shield 11 and tie-down cables 12 extend down and out at an angle (e.g. 45°–60°) from a windup mechanism 20 along a roof edge of the structure 10 to an anchor channel system 30 in a trench below ground level G. Incidentally, in FIG. 2 the storm shield is invisible, as if it were transparent. It is not transparent. It is shown that way only to help illustrate its position relative to the structure 10. I point this out to make it clear that my system is not simply a network of tie-down cables.

Figure 4:
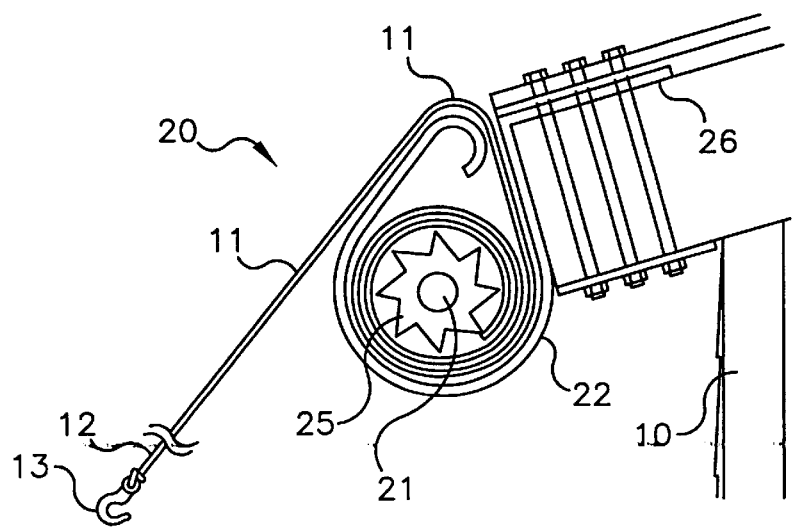
FIG. 4 is an enlarged axial view of a roof mounted cable windup mechanism.

FIG. 4 is an enlarged axial view of a cable windup mechanism 20 mounted on a roof edge of the structure 10. The mechanism 20 includes a releasable ratchet 21 rotatably mounted on a windup axis 25 within a housing 22. A section of storm shield 11 with embedded cable 12 is shown partially wound up around the windup axis 25 ratchet 21. The outer end of the tie-down cable 12 includes a hook 13 for releasable connection to an anchor bolt 34 (see FIG. 5). The housing 22 is configured in a substantially closed curve, surrounding the windup axis 25 and windup mechanism 20, to house the storm shield 11. A flange 26 extends at a right angle away from the top opening of the housing 22 for attachment to the edge of the roof of the structure 10.

Figure 5:
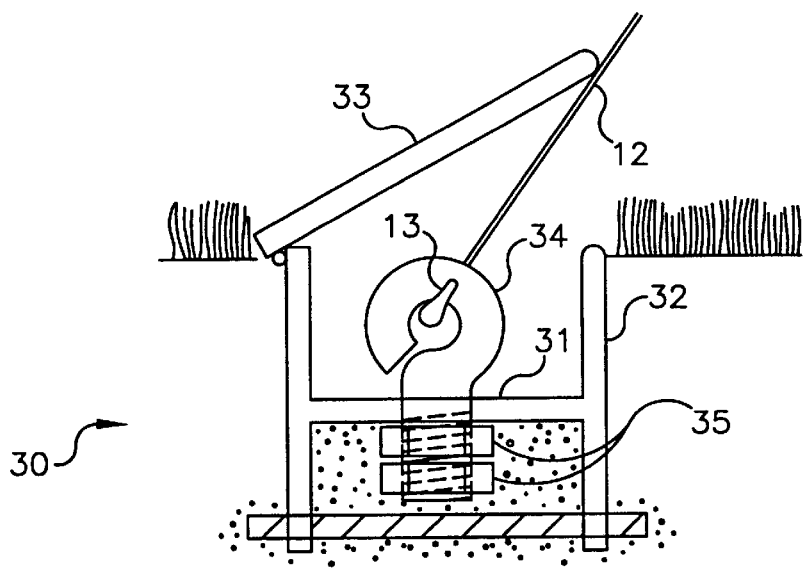
FIG. 5 is an enlarged view of one of several anchor points of this invention.

FIG. 5 is an enlarged view of one of the several anchor points of this invention. The anchor system 30 of this invention includes a channel 31 formed by a channel beam or I-beam 32 permanently fixed in a trench around the structure 10. The channel 31 includes a lengthwise lid 33 which is movable between open and closed positions. The opening of the lid 33 is on the side of the channel 31 toward the structure 10. A series of anchor bolts 34 is mounted into the channel 31, spaced 18"apart around the channel perimeter, and secured to the channel 31 by nuts 35. The outer end of each tie-down cable 12 is releasably connected to one of the anchor bolts 34 by a hook 13. The lid 33 is preferably spring-loaded to keep it normally closed.

Figure 6:
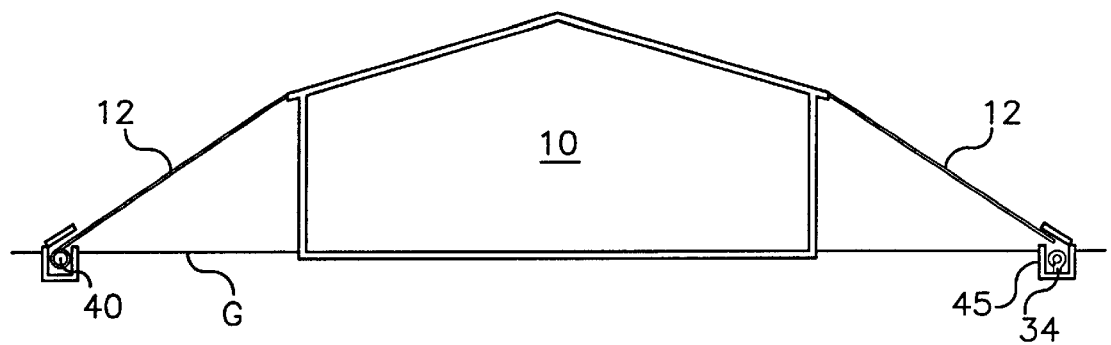
FIG. 6 is an end elevation view, similar to FIG. 2, of an alternative hurricane protection system according to this invention.
Figure 7:
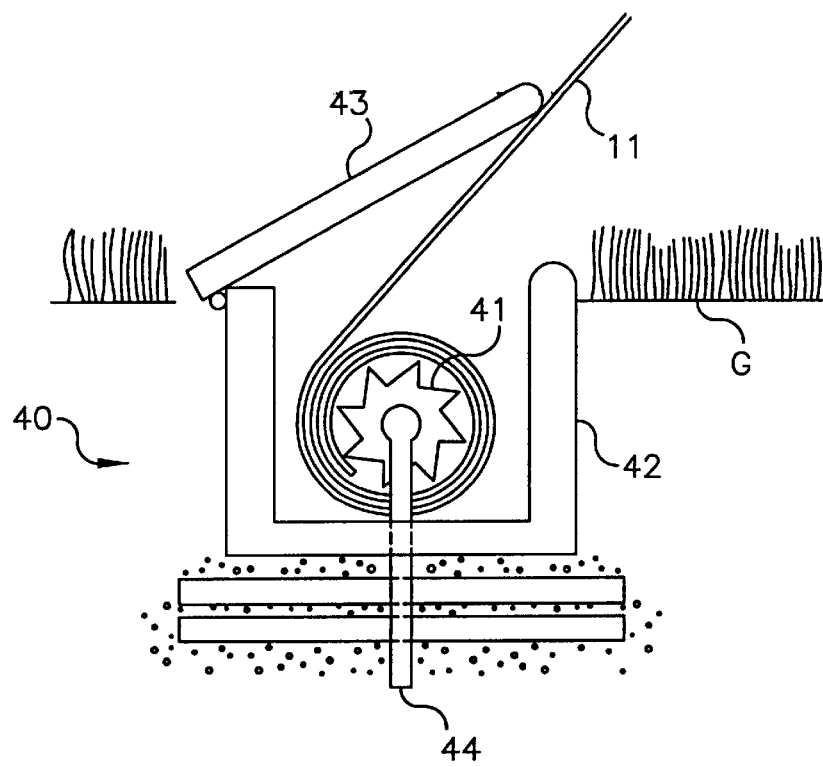
FIG. 7 is an enlarged axial view of a ground mounted cable windup mechanism.

FIG. 6 represents an alternative system in which the storm shield 11 is deployed from a storage system at ground level, up and over the mobile home or structure 10, and down to an anchor system on the other side. FIG. 7 is an enlarged axial view of the ground storage system which includes a number of spaced ground anchors 44 along one side of the structure 10 (only one is visible in FIG. 7) supporting a cable windup mechanism 40. The mechanism 40 includes a releasable ratchet 41 rotatably mounted within a housing 42 and covered by a lid 43. A section of storm shield 11 with embedded cables 12 is shown in a wound up configuration within the housing 42. The outer or leading edge of the storm shield 11, and its several tie-down cables 12, extend up and over the structure 10 for releasable connection to corresponding anchor bolts 34 spaced along an anchor channel 45 (similar to channel 31 in FIG. 5) on the opposite side of the structure 10.

Figure 8:
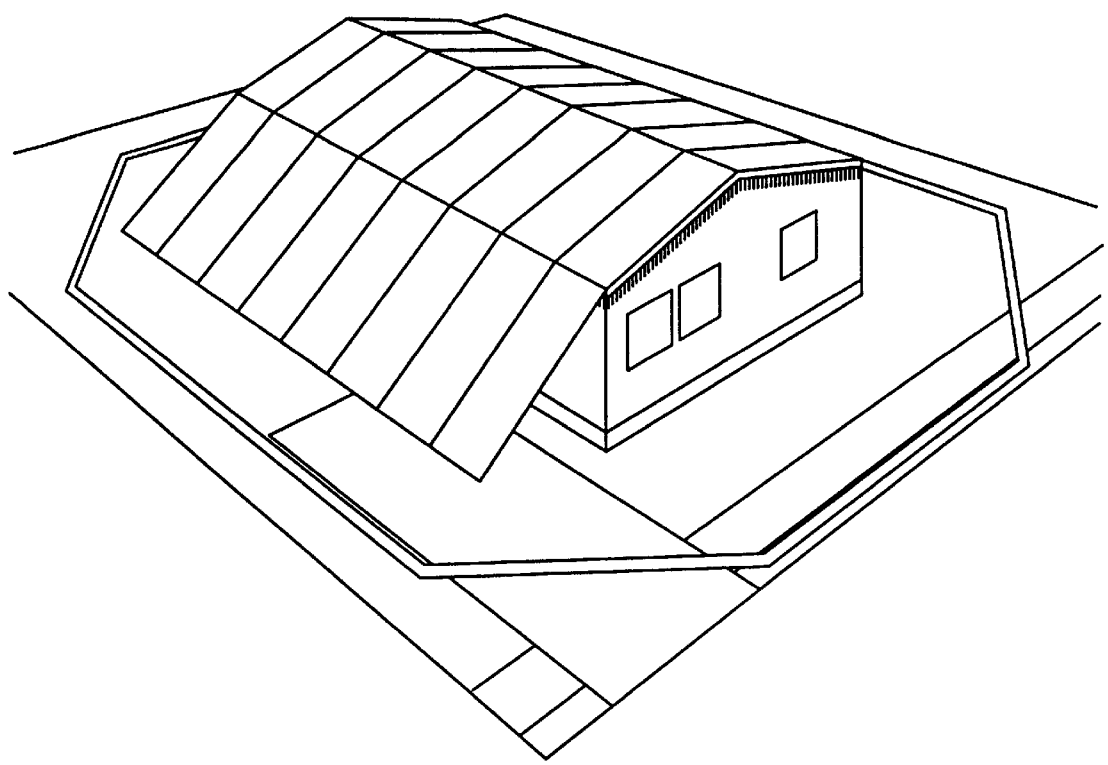
FIG. 8 shows the house of FIG. 1 with the protection system of this invention being deployed from storage into operative position.

FIG. 8 shows the general method by which the storm shield 11 is put in place. In the embodiment of FIGS. 3–5, the shield is drawn down from its storage housing on the edge of the roof, tie-down cables are connected to corresponding anchor points in the ground, and the shield is made taut by the windup mechanism. In the embodiment of FIGS. 6–7, the shield is drawn up and over the structure from its storage housing in the ground on one side of the structure, tie-down cables are connected to corresponding anchor points in the ground on the other side, and the shield is made taut by the windup mechanism.

The storm shield 11 in place, as best illustrated in FIGS. 3 and 6, provides a revolutionary system of hurricane protection. First, the storm shield 11 is at a substantial angle from vertical, providing a surface sloping upward on one side of the structure 10, and down and away from the other side, to deflect the wind and not to bear the brunt of it. This reduces the direct wind impact on the windward side, and it reduces the trailing vacuum on the leeward side, of the structure. Second, the entire periphery of the storm shield is fixed and anchored below ground level. This prevents wind from getting under and into the enclosure which the storm shield effectively creates.

Figure 9:
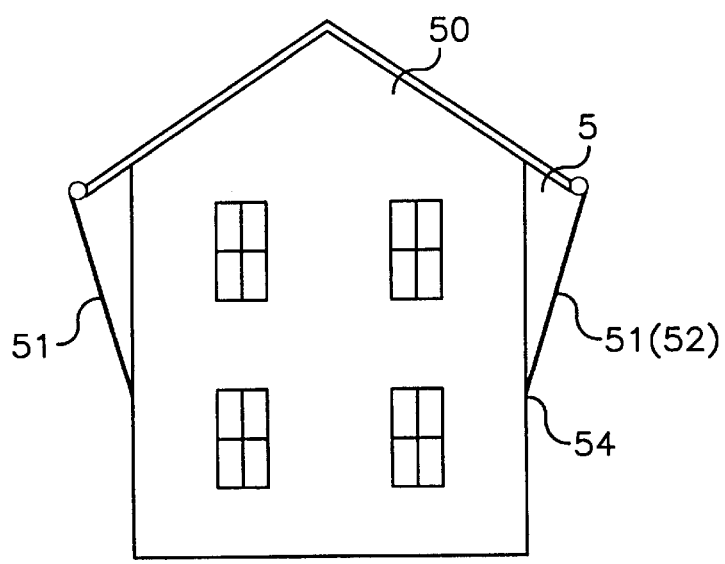
FIG. 9 is a schematic representation of a modified form of my hurricane protection system, for use with a multi-story building.

FIG. 9 shows a related system and technique which is applicable to larger buildings, such as a typical two-story house with an overhanging roof. The roof overhang provides a site S for wind to do its damage. A system similar to that shown in FIG. 4 is employed. It includes a cable windup mechanism mounted on the roof edge of the house 50. The mechanism includes a releasable ratchet rotatably mounted on a windup axis within a housing, all as shown in FIG. 5. A shield 51 with embedded cables 52 extends down and in, from its storage position on the roof edge to a series of anchor points 54 located around the perimeter of the house. With the shield 51 in place, the resulting shape of the house and roof enhances the movement of air over and around the house and reduces the likelihood of wind damage to the house.

Another important characteristic of the systems described above is that they are easily and quickly converted from storage into operative position.

In the foregoing specification, "ground" means earth or other supporting surface. The sheet material over the tie-down cables is called "storm shield" rather than "wind shield" which generally means a transparent screen in front of occupants of a vehicle.

The foregoing description of a preferred embodiment of this invention, including any dimensions, angles, or proportions, is intended as illustrative. The concept and scope of the invention are limited only by the following claims and equivalents thereof.

What is claimed is:

1. A wind protection system for a building structure, including:
    a plurality of ground anchors disposed in and spaced along a continuous below-ground-level channel surrounding said structure and spaced therefrom
    tie-down cables extending from the roof of said structure to said ground anchors, each of said cables removably connected to one of said ground anchors; and
    a storm shield secured to said cables and extending from said roof and into said channel below ground level.

2. A wind protection system for a building structure, including:
    a channel disposed below ground level and extending around said structure, said channel including a normally closed lid around the perimeter thereof;
    tie-down anchor means disposed at spaced intervals along and within said channel around said structure;
    tie-down cables extending from the roof of said structure to said channel, each of said cables removably connected to one of said anchor means; and
    a storm shield secured to said cables and extending from said roof and into said channel below ground level.

3. A wind protection system as defined in claim 2, further including:
    a cable windup mechanism disposed on a roof edge of said structure to wind up said cables and storm shield for storage at said roof edge, and to unwind said cables and storm shield for connection of said cables to said tie-down anchor means.

4. A wind protection system for a building structure, including:
    a channel disposed below ground level and extending around said structure, said channel including a lid around the perimeter thereof, said lid being movable between open and closed positions, the opening of said lid being on the side of said channel toward said structure;
    tie-down anchor bolts mounted at spaced intervals along and within said channel around said structure;
    tie-down cables extending from a roof edge of said structure to said channel, each of said cables removably connected to one of said anchor bolts;
    a storm shield secured to said cables and extending from said roof edge and into said channel below ground level; and a cable windup mechanism disposed on a roof edge of said structure to wind up said cables and storm shield for storage at said roof edge, and to unwind said cables and storm shield for connection of said cables to said tie down anchor means.

5. A wind protection system for a building structure, including:

a storm shield storage system along one side of said structure and spaced therefrom, said storage system including a plurality of ground anchors supporting a ratcheted cable windup mechanism below ground level, and a housing over said anchors and said mechanism extending along the length of said storage system;

a storm shield anchor system along the opposite side of said structure and spaced therefrom, said anchor system including a plurality of ground anchors spaced therealong below ground level;

a tie-down cable extending from each of said ground anchors of said storage system, up and over said structure, and removably connected to a corresponding one of said ground anchors of said anchor system; and a storm shield secured to said cables and extending from below ground in said storage system to below ground in said anchor system.

* * * * *